United States Patent
Takamoto

(10) Patent No.: US 10,048,901 B2
(45) Date of Patent: Aug. 14, 2018

(54) CONTROL DEVICE, CONTROL METHOD OF A CONTROL DEVICE, AND STORAGE MEDIUM

(71) Applicant: Seiko Epson Corporation, Tokyo (JP)

(72) Inventor: Akio Takamoto, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 66 days.

(21) Appl. No.: 14/311,704

(22) Filed: Jun. 23, 2014

(65) Prior Publication Data

US 2014/0376009 A1     Dec. 25, 2014

(30) Foreign Application Priority Data

Jun. 21, 2013   (JP) .................................. 2013-130318

(51) Int. Cl.
```
G06F 3/12       (2006.01)
G06K 15/02      (2006.01)
G07G 5/00       (2006.01)
G06Q 20/20      (2012.01)
```

(52) U.S. Cl.
CPC .......... G06F 3/1206 (2013.01); G06F 3/1241 (2013.01); G06F 3/1244 (2013.01); G06F 3/1284 (2013.01); G06Q 20/209 (2013.01); G07G 5/00 (2013.01)

(58) Field of Classification Search
CPC .... G06F 3/1206; G06F 3/1284; G06F 3/1244; G06F 3/1241; G06Q 20/209; G07G 5/00
USPC ........................................................ 358/1.6
See application file for complete search history.

(56) References Cited

U.S. PATENT DOCUMENTS

| | | | | |
|---|---|---|---|---|
| 2003/0074254 A1* | 4/2003 | Iijima | .................. | G06Q 20/387 705/14.38 |
| 2003/0193686 A1* | 10/2003 | Nathan | ............... | G06F 13/4045 358/1.15 |
| 2009/0066996 A1* | 3/2009 | Minowa | ..................... | B41J 3/54 358/1.15 |
| 2010/0027065 A1* | 2/2010 | Koakutsu | ................ | G06F 3/121 358/1.15 |
| 2013/0204697 A1* | 8/2013 | Boal | .................. | G06Q 30/0207 705/14.51 |

FOREIGN PATENT DOCUMENTS

| | | |
|---|---|---|
| JP | 2008-244628 A | 10/2008 |
| JP | 2009-129029 A | 6/2009 |

(Continued)

*Primary Examiner* — Neil R McLean
*Assistant Examiner* — Darryl V Dottin
(74) *Attorney, Agent, or Firm* — Nutter McClennen & Fish LLP; John J. Penny, Jr.; Todd Gerety

(57) ABSTRACT

A control device is enabled to separately produce receipts and coupons without modification of the control device. A host computer has a print control unit that generates and outputs a receipt control command causing a receipt printer to produce a receipt; and a data processing unit that determines if a coupon image print instructions command is included in the receipt control command generated by the print control unit, and if a coupon image print instructions command is included, generates and outputs to the receipt printer a receipt control command without the coupon image print instructions command, and generates and outputs to a coupon printer a coupon control command to print a coupon image based on the coupon image print instructions command.

13 Claims, 6 Drawing Sheets

(56) References Cited

FOREIGN PATENT DOCUMENTS

| JP | 2012-168758 A | 9/2012 |
| JP | 2012-208765 A | 10/2012 |
| JP | 2012-226413 A | 11/2012 |

\* cited by examiner

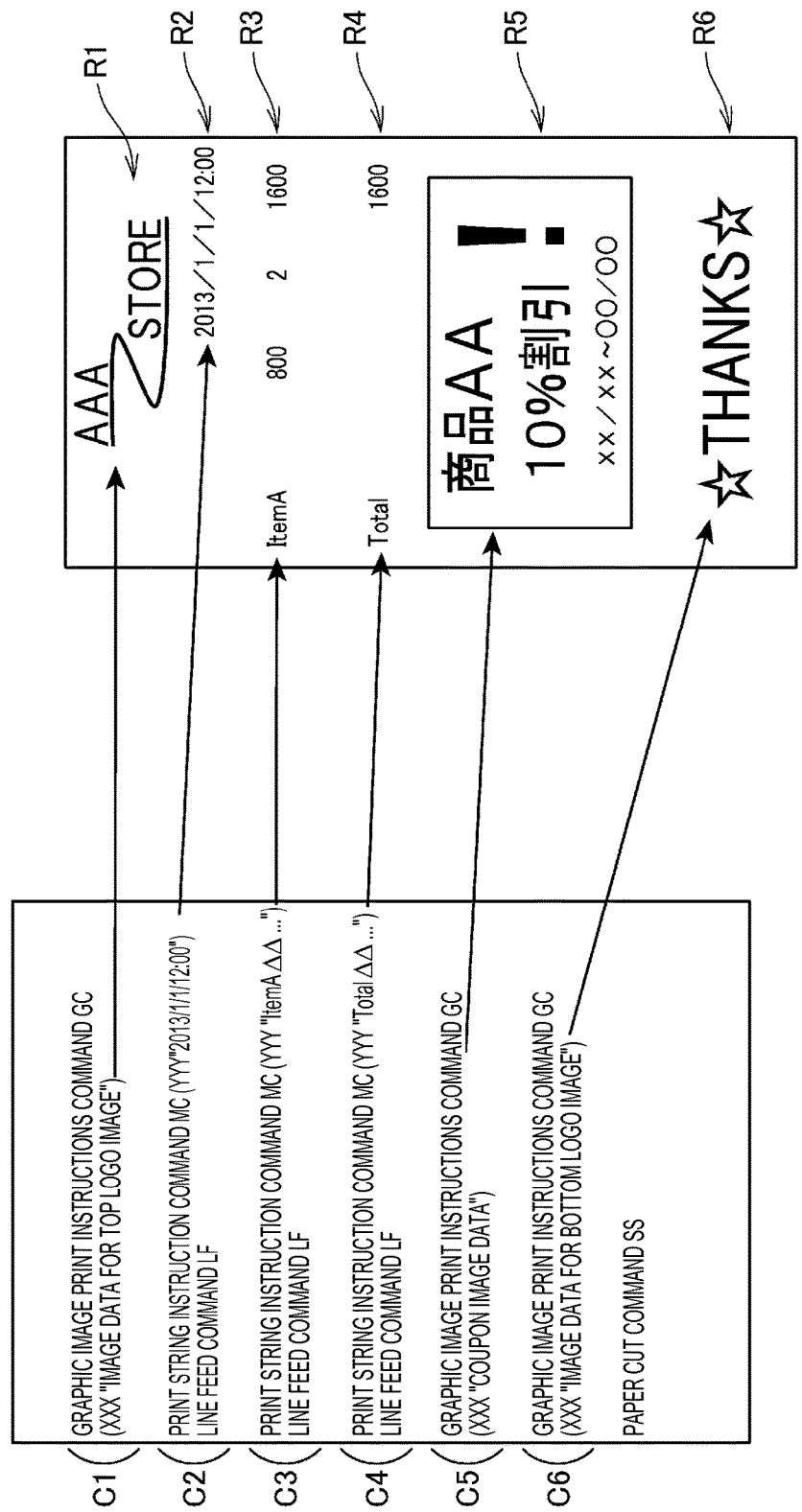

CONTROL DEVICE, CONTROL METHOD OF A CONTROL DEVICE, AND STORAGE MEDIUM

Priority is claimed under 35 U.S.C. § 119 to Japanese Application nos. 2013-130318 filed on June 21, which is hereby incorporated by reference in their entirety.

BACKGROUND

1. Technical Field

The present invention relates to a control device that connects to a printing device for printing receipts, to a control method of the control device, and to a storage medium storing a program related to control of the control device.

2. Related Art

Systems that produce receipts and coupons are known from the literature. See, for example, JP-A-2009-129029. Some systems print coupon images on receipts with a printer as controlled by a control device.

In systems that print coupon images on receipts as in the above system, issuing individual receipts and coupons instead of printing the coupon image on the receipt is sometimes desirable. If the existing control device can be made to print receipts and coupons separately with minimal modification of the control device, the job of changing the system to separately print receipts and coupons becomes easier and the cost can also be reduced.

SUMMARY

The present invention enables individually printing receipts and coupons while minimizing modification of the control device.

A control device according to the invention connects to a first printing device that prints receipts and a second printing device that is different from the first printing device, and includes: a print control unit that generates and outputs a receipt control command causing the first printing device to produce a receipt; and a data processing unit that determines if a coupon image print instructions command, which is an image print instructions command instructing printing an image based on image data and instructs printing a coupon image, is included in the receipt control command generated by the print control unit, and if a coupon image print instructions command is included, generates and outputs to the first printing device a receipt control command without the coupon image print instructions command, and generates and outputs to the second printing device a coupon control command to print a coupon image based on the coupon image print instructions command.

If a coupon image print instructions command is found in the receipt control command, this aspect of the invention outputs the receipt control command stripped of the coupon image print instructions command to the first printing device, and outputs a coupon control command based on the coupon image print instructions command to the second printing device. As a result, a receipt printed without a coupon printed thereon is output by the first printing device, and a coupon is produced by the second printing device. Because the control commands output by the print control unit to produce individual receipts and coupons are the same as the control commands for printing a coupon image on a receipt, there is no need to change the program rendering print control unit functions. More specifically, there is no need to modify the control device.

In another aspect of the invention, the data processing unit extracts the image print instructions command from the receipt control command, compares the image data contained in the extracted image print instructions command with previously stored template data, and if the data match, determines the extracted image print instructions command is the coupon image print instructions command and determines the coupon image print instructions command is included in the receipt control command.

The image of the coupon intended to be printed on the receipt is not generated ad hoc, but instead is selected from a group of predetermined images. Based on the result of using this feature to compare image data contained in the image print instructions command extracted from the receipt control command with previously stored template data, this configuration can accurately determine if the extracted image print instructions command is a coupon image print instructions command.

In another aspect of the invention, the data processing unit extracts the image print instructions command from the receipt control command, recognizes a character in image data contained in the extracted image print instructions command, and if a predetermined specific string is found, determines the extracted image print instructions command is the coupon image print instructions command and determines the coupon image print instructions command is included in the receipt control command.

In this configuration, a specific string is contained in the image of the coupon intended to be printed on the receipt. Using this feature, this configuration can accurately determine if the extracted image print instructions command is a coupon image print instructions command based on the result of character recognition.

In another aspect of the invention, the data processing unit extracts the image print instructions command from the receipt control command, and if at least part of the image data contained in the extracted image print instructions command includes a predetermined specific data train, determines the extracted image print instructions command is the coupon image print instructions command and determines the coupon image print instructions command is included in the receipt control command.

In this configuration, the image of the coupon intended to be printed on the receipt is not generated ad hoc, but instead is selected from a group of previously stored images, and part of a particular image includes a specific data train. Using this feature, this aspect of the invention can accurately determine if the extracted image print instructions command is a coupon image print instructions command.

In another aspect of the invention, the data processing unit extracts the image print instructions command from the receipt control command, and if an image data error correction code or hash value contained in the extracted image print instructions command matches a predetermined specific value, determines the extracted image print instructions command is the coupon image print instructions command and determines the coupon image print instructions command is included in the receipt control command.

In this configuration, the image of the coupon intended to be printed on the receipt is not generated ad hoc, but instead is selected from a group of previously stored images, and the error detection code or hash value of any one image is a specific value. Using this feature and the error detection code or hash value, this embodiment can accurately determine if the extracted image print instructions command is a coupon image print instructions command.

In another aspect of the invention, when a specific condition related to the transaction for which a receipt is to be produced is met, the print control unit includes the coupon image print instructions command related to the coupon corresponding to the satisfied condition in the receipt control command; and the data processing unit determines based on the receipt control command if a specific condition related to the transaction for which a receipt is to be produced is met, and if the condition is met, determines the coupon image print instructions command is included in the receipt control command.

Because a coupon image print instructions command corresponding to the condition is included in the receipt control command when a particular condition is met, this embodiment can accurately determine if a coupon image print instructions command is contained in the receipt control command.

Another aspect of the invention is a control method of a control device that connects to a first printing device that prints receipts and a second printing device that is different from the first printing device, the control method including: generating and outputting a receipt control command causing the first printing device to produce a receipt; determining if a coupon image print instructions command, which is an image print instructions command instructing printing an image based on image data and instructs printing a coupon image, is included in the generated receipt control command; and if a coupon image print instructions command is included, generating and outputting to the first printing device a receipt control command without the coupon image print instructions command, and generating and outputting to the second printing device a coupon control command to print a coupon image based on the coupon image print instructions command.

If a coupon image print instructions command is found in the receipt control command, this aspect of the invention outputs the receipt control command stripped of the coupon image print instructions command to the first printing device, and outputs a coupon control command based on the coupon image print instructions command to the second printing device. As a result, a receipt printed without a coupon printed thereon is output by the first printing device, and a coupon is produced by the second printing device. Because the control commands output by the print control unit to produce individual receipts and coupons are the same as the control commands for printing a coupon image on a receipt, there is no need to change the program rendering print control unit functions. More specifically, there is no need to modify the control device.

Another aspect of the invention is a storage medium storing a program executed by a control unit controlling a control device that connects to a first printing device that prints receipts and a second printing device that is different from the first printing device, the program causing the control unit to function as: a print control unit that generates and outputs a receipt control command causing the first printing device to produce a receipt; and a data processing unit that determines if a coupon image print instructions command, which is an image print instructions command instructing printing an image based on image data and instructs printing a coupon image, is included in the receipt control command generated by the print control unit, and if a coupon image print instructions command is included, generates and outputs to the first printing device a receipt control command without the coupon image print instructions command, and generates and outputs to the second printing device a coupon control command to print a coupon image based on the coupon image print instructions command.

According to this program, if a coupon image print instructions command is found in the receipt control command, this aspect of the invention outputs the receipt control command stripped of the coupon image print instructions command to the first printing device, and outputs a coupon control command based on the coupon image print instructions command to the second printing device. As a result, a receipt printed without a coupon printed thereon is output by the first printing device, and a coupon is produced by the second printing device. Because the control commands output by the print control unit to produce individual receipts and coupons are the same as the control commands for printing a coupon image on a receipt, there is no need to change the program rendering print control unit functions. More specifically, there is no need to modify the control device.

Effect of the Invention

The invention enables printing individual receipts and coupons while minimizing modification of the control device.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 4 (A) illustrates the content of control commands for printing a receipt, and (B) shows the receipt printed on the receipt control commands.

DESCRIPTION OF EMBODIMENTS

Preferred embodiments of the present invention are described below with reference to the accompanying figures.

Embodiment 1

Figure 1:
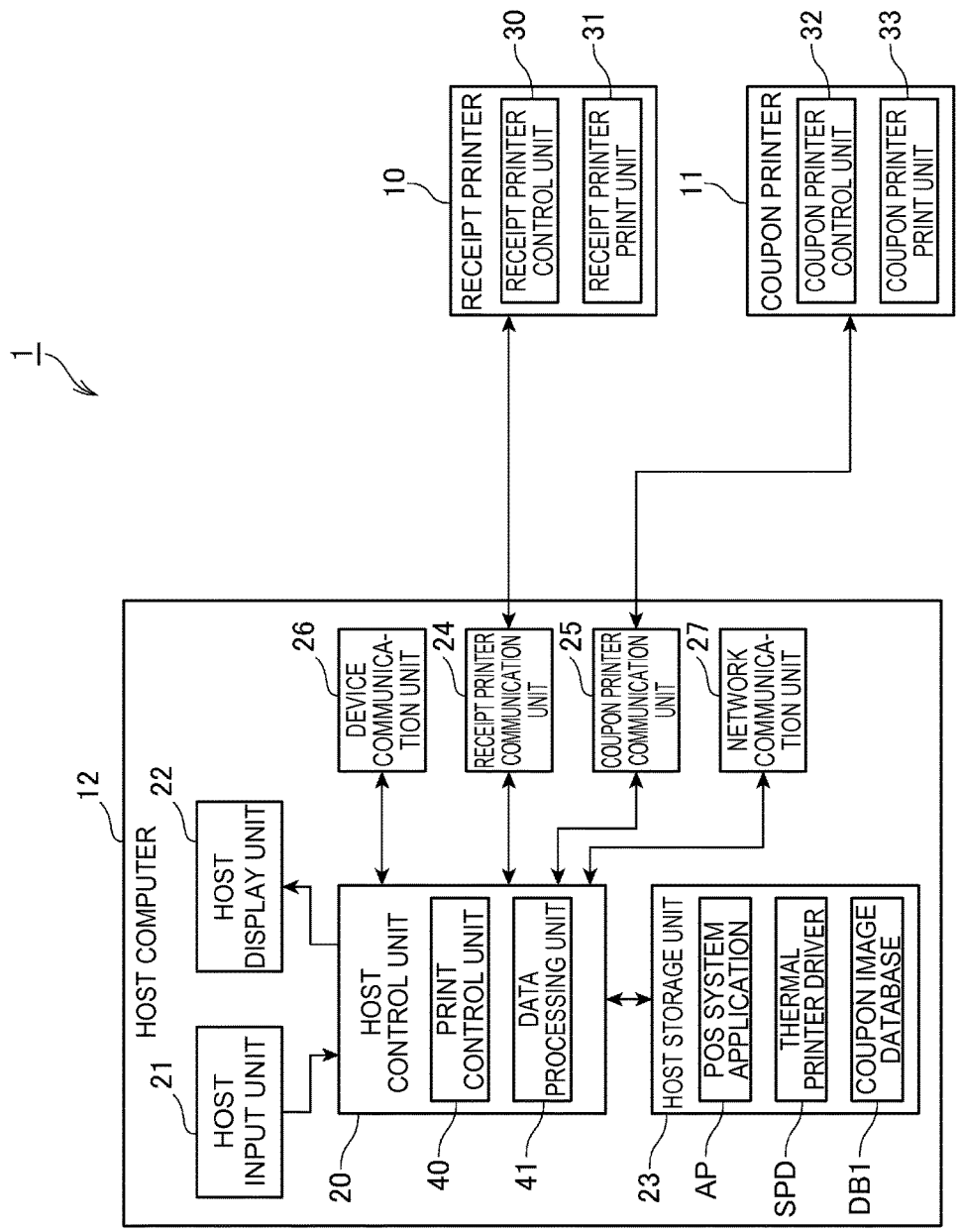
FIG. 1 is a block diagram showing the functional configuration of a control system according to a preferred embodiment of the invention.

FIG. 1 is a block diagram showing the functional configuration of a control system 1 according to this embodiment of the invention.

This control system 1 is part of a POS system such as used in supermarkets and convenience stores to manage product marketing, sales, and inventory, for example, in a store. The control system 1 has a function for producing receipts according to customer transactions in the store, and a function for producing an appropriate coupon based on production of a receipt.

A store in which the control system 1 is deployed has plural checkout counters L. A receipt printer 10 (first printing device), which is a printer for producing receipts, a coupon printer 11 (second printing device), which is a printer for producing coupons, and a host computer 12 (control device) that controls the printers are installed at each checkout counter L.

The receipt printer 10 is a thermal printer capable of monochrome or color printing, and as controlled by the corresponding host computer 12, applies heat by the thermal head to the printing surface of thermal roll paper to print images, and then cuts the thermal roll paper at a specific position to issue a receipt.

The coupon printer 11 is, for example, a color inkjet printer, and as controlled by the corresponding host computer 12, ejects ink from an inkjet head onto the printing surface of roll paper to print images, and then cuts the roll paper at a specific position to issue a coupon.

While not shown in FIG. 1, a POS management server is connected through a network such as a LAN or the Internet to the host computer 12. The POS management server stores databases such as a product master, customer master, and inventory master, and centrally manages the control system 1. The host computer 12 accesses the POS management server 14 as appropriate when producing a receipt to acquire the necessary information.

Before the control system 1 became configured as shown in FIG. 1, only the receipt printer 10 was connected to the host computer 12 and the coupon printer 11 was not connected. To issue a coupon, the receipt printer 10 was controlled to print a receipt with a coupon image printed on the receipt.

One purpose of the control system 1 according to this embodiment of the invention is to enable printing individual receipts and coupons by connecting a new coupon printer 11, which is an inkjet printer capable of producing a more dynamic printout than a thermal printer, and printing coupons with the coupon printer 11. When changing the system in this way, the cost of modifying the system is reduced by minimizing software changes on the host computer 12 and thereby simplifying reconfiguring the system.

Note that for convenience of description below, the system that has only a receipt printer 10 connected to the host computer 12 and prints coupon images on receipts is referred to as conventional system Q.

As shown in FIG. 1, the host computer 12 includes a host control unit 20 (control unit), a host input unit 21, a host display unit 22, a host storage unit 23, a receipt printer communication unit 24, a coupon printer communication unit 25, a device communication unit 26, and a network communication unit 27.

The host control unit 20 includes a CPU, ROM, RAM, and other peripheral circuits, and controls other parts of the host computer 12. Function blocks of the host control unit 20 include a print control unit 40 and a data processing unit 41, which are further described below.

The host input unit 21 is connected to input devices such as a mouse and keyboard, detects input through these input devices, and outputs the input data to the host control unit 20. The host display unit 22 is connected to an LCD panel or other display panel, and as controlled by the host control unit 20, displays data on the display panel. The host storage unit 23 has memory such as a hard disk drive or EEPROM device, and nonvolatilely stores data rewritably. A POS system application AP, a thermal printer driver SPD, and a coupon image database DB1 are stored (installed) in the host storage unit 23 as further described below. The receipt printer communication unit 24 communicates with the receipt printer 10 as controlled by the host control unit 20 according to a specific communication protocol. The coupon printer communication unit 25 communicates with the coupon printer 11 as controlled by the host control unit 20 according to a specific communication protocol.

The device communication unit 26 is connected to devices including a barcode reader that reads barcodes from products and packaging, a card reader that reads information recorded on a card such as a member card, and a cash register that holds bills and change. The device communication unit 26 communicates with each device as controlled by the host control unit 20.

The network communication unit 27 communicates through the network with external devices (such as the POS management server) on the network according to a specific communication protocol as controlled by the host control unit 20.

As also shown in FIG. 1, the receipt printer 10 has a receipt printer control unit 30 and a receipt printer print unit 31. The receipt printer control unit 30 has a CPU, and controls other parts of the receipt printer 10. The receipt printer print unit 31 has a printhead that prints images on a recording medium, a conveyance mechanism that conveys the recording medium, and a cutting mechanism that cuts the recording medium.

As also shown in FIG. 1, the coupon printer 11 has a coupon printer control unit 32 and a coupon printer print unit 33. The coupon printer control unit 32 has a CPU, and controls other parts of the coupon printer 11. The coupon printer print unit 33 has an inkjet printhead, a carriage that moves the printhead, a recording medium conveyance mechanism, and a cutting mechanism that cuts the recording medium. The inkjet head receives ink supplied from a plurality of color ink cartridges, and the coupon printer 11 can print in color.

Figure 2:
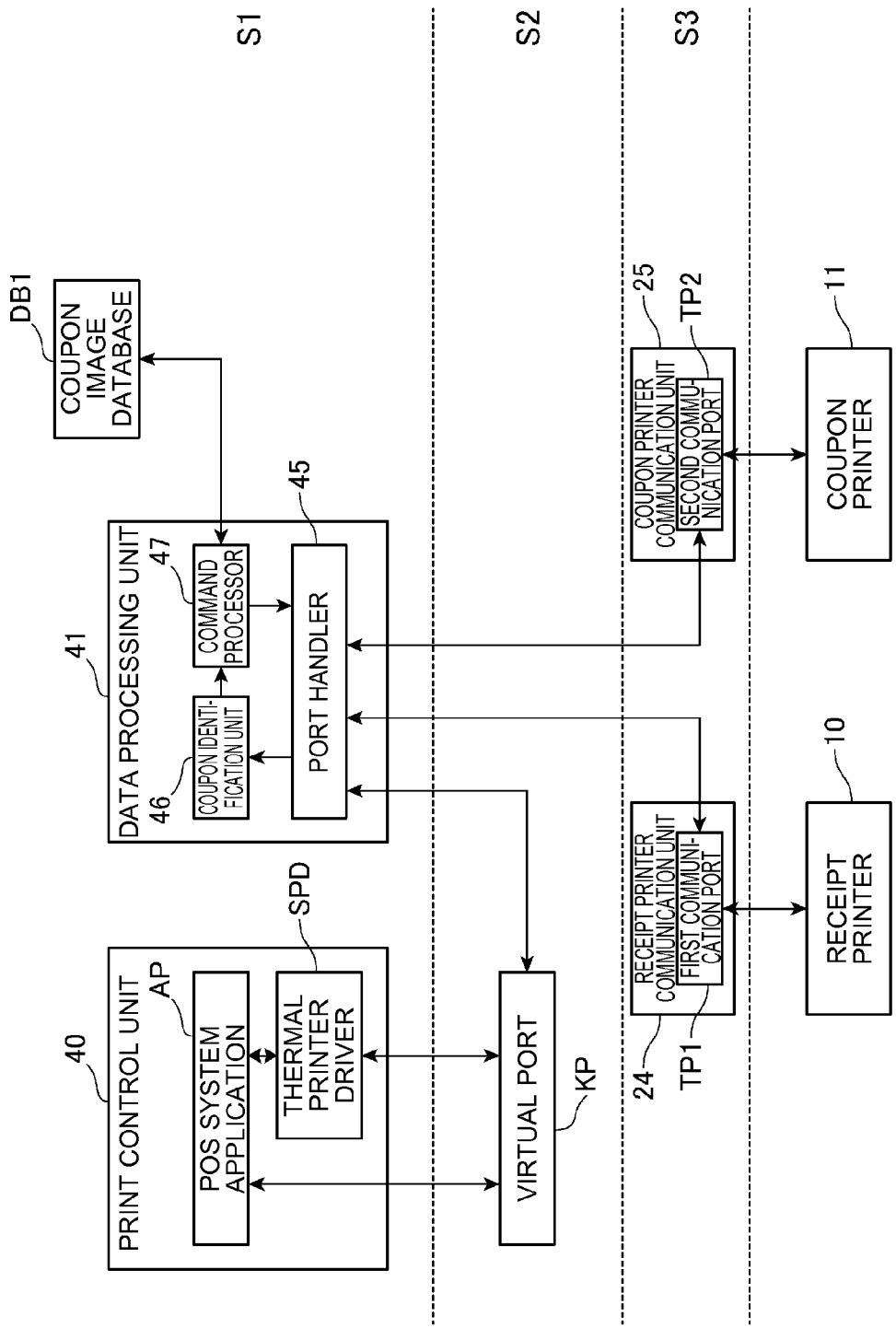
FIG. 2 is a block diagram showing the functional configuration of the host computer in detail.

FIG. 2 illustrates the functional configuration of the host computer 12 in detail.

For convenience of description, all function blocks, programs, software (logical) ports, and physical devices are represented by equivalent blocks in FIG. 2.

Note, further, that the functions of the function blocks described below are achieved by the cooperation of hardware and software, such as a CPU reading and running a program.

The print control unit 40 of the host control unit 20 is a function block capable of generating and outputting control commands compatible with the receipt printer 10 (first printing device), which is a thermal printer, and processing data input from the receipt printer 10.

Functions of the print control unit 40 are rendered by the POS system application AP, thermal printer driver SPD, and associated programs.

To produce a receipt, the POS system application AP generates data including the information required to produce the receipt (referred to below as "print data"), and outputs to the thermal printer driver SPD.

Based on the input print data, the thermal printer driver SPD generates control commands in the command language of the receipt printer 10, and outputs to a virtual port KP, which is opened as a software (logical) port.

Note that after being generated by the POS system application AP, specific output data is output directly to the virtual port KP, and specific input data is input directly to the POS system application AP through the virtual port KP.

In the conventional system Q described above, coupons are issued by printing the coupon image on a receipt. As will be understood below, the control system 1 according to this embodiment prints receipts and coupons separately, and modification of the POS system application AP and thermal printer driver SPD is not required to accomplish this. Therefore the control commands output by the print control unit 40 to produce a receipt are the same as the control commands issued in the conventional system Q.

Note, further, that the control commands output by the print control unit 40 are referred to as receipt control commands below.

The receipt control commands output by the print control unit 40 to the virtual port KP are passed to the port handler 45 of the data processing unit 41. More specifically, the print control unit 40 outputs the generated receipt control commands through the virtual port KP to the data processing unit 41.

The data processing unit 41 is a function block of the host control unit 20, and as shown in FIG. 2 includes the port handler 45, coupon identification unit 46, and command processor 47. One purpose of the data processing unit 41 is to extend the functionality of the POS system application AP and the thermal printer driver SPD. As will be clear below, this embodiment enables changing the configuration of the system without modifying the POS system application AP and thermal printer driver SPD, and this is enabled by a function of the data processing unit 41.

The port handler 45 of the data processing unit 41 can input/output data through the first communication port TP1 and second communication port TP2, which are physical ports. These communication ports in this embodiment are communication ports conforming to the USB communication protocol. The receipt printer 10 is connected to the first communication port TP1 through a communication cable conforming to the appropriate communication protocol. The coupon printer 11 is likewise connected to the second communication port TP2 through a communication cable conforming to the appropriate communication protocol.

The functions of the port handler 45 include at least the following.

One function of the port handler 45 is to output data (such as receipt control commands) input through the virtual port KP to the coupon identification unit 46.

Another function of the port handler 45 is to output data input from the command processor 47 (described below) to the first communication port TP1 or second communication port TP2 as controlled by the command processor 47. When outputting data, the port handler 45 converts the data appropriately to the output port by a function of a port communication service (PCS).

A port communication service is a function that can be called from a program, including the thermal printer driver SPD, and converts data according to the standard (such as RS232C or USB) of the interface. The port communication service absorbs differences between interface standards, and eliminates the need for software modification of the POS application AP and thermal printer driver SPD due to differences between the standards used by the different interfaces.

The coupon identification unit 46 and command processor 47 of the data processing unit 41 work together to perform the following processes. More specifically, they execute a process to generate and output receipt control commands and coupon control commands based on the receipt control commands input from the print control unit 40. Operation of these function blocks is further described below.

The function of the coupon identification unit 46 and command processor 47 is rendered by a program written using API functions provided by OPOS or UPOS. The programs related to these function blocks can also be called as needed by the thermal printer driver SPD, which conforms to the same OPOS and UPOS standards.

The receipt printer communication unit 24 sends data input from the port handler 45 to the first communication port TP1 to the receipt printer 10 based on the appropriate communication protocol.

The coupon printer communication unit 25 sends data input from the port handler 45 to the second communication port TP2 to the coupon printer 11 based on the appropriate communication protocol.

Note that in a hierarchical operating system, the print control unit 40 and data processing unit 41 are on an application layer S1, the virtual port KP is on the kernel layer S2, and the first communication port TP1 and second communication port TP2 are on a physical layer S3.

The operation of the host computer, and particularly the operation of the print control unit 40 and data processing unit 41, when producing a receipt and a coupon in this control system 1 is described next.

Figure 3:
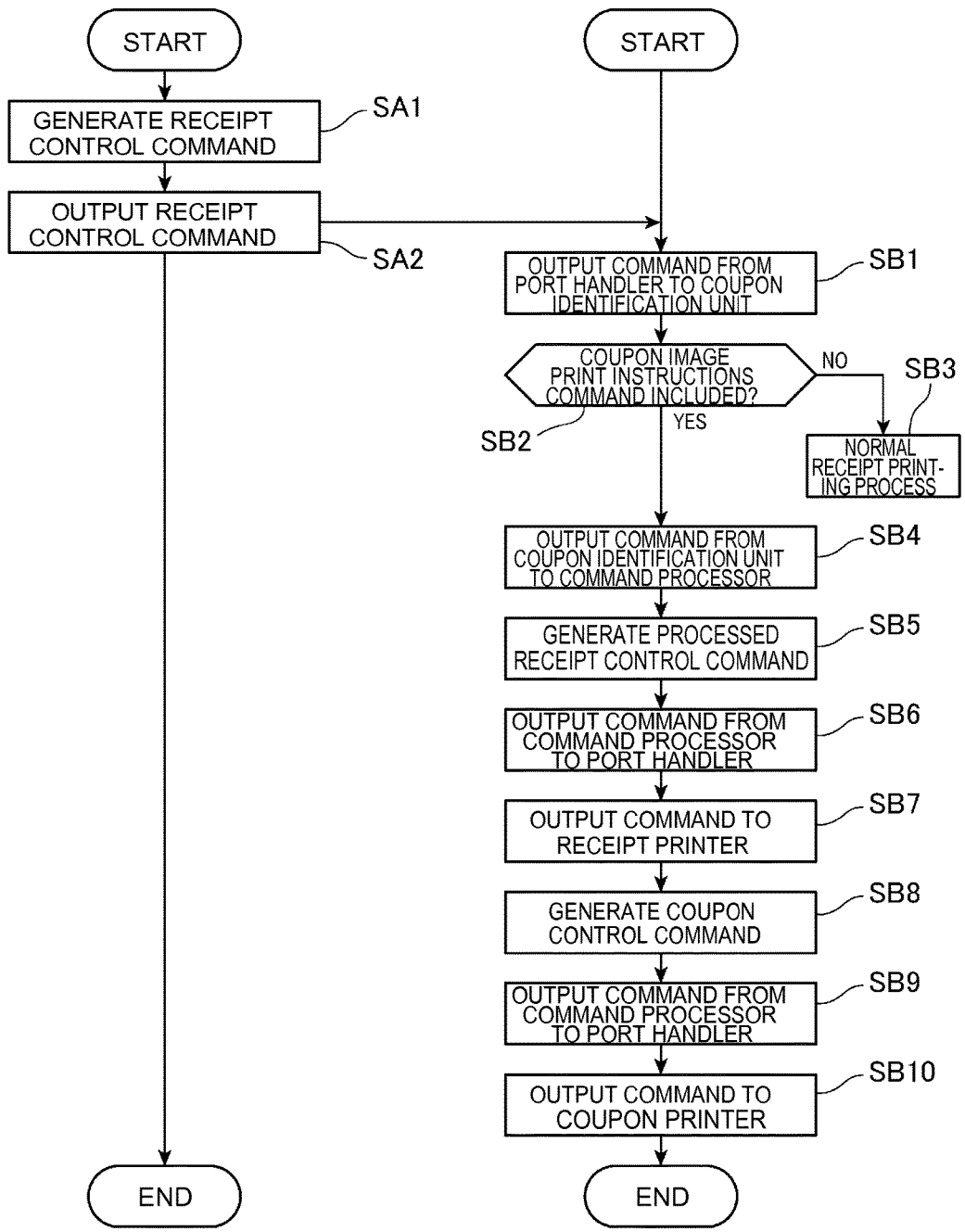
FIG. 3 is a flow chart of the operation of the host computer.

FIG. 3 is a flow chart showing the operation of the function blocks in this operation, column (A) describing the operation of the print control unit 40, and (B) the operation of the data processing unit 41.

Note, further, that the receipt control command output by the print control unit 40 is a command for printing a receipt on which a coupon image is also printed.

The print control unit 40 generates a receipt control command in the command language of the receipt printer 10 (step SA1), and outputs through the virtual port KP to the port handler 45 of the data processing unit 41 (step SA2).

Image data for coupon images is stored in a storage area accessible by the POS system application AP. In step SA1, the POS system application AP selects the appropriate image data from the stored image data for plural different coupons, and outputs print data including the selected image data to the thermal printer driver SPD.

FIG. 4 (A) illustrates an example of the content of receipt control commands, and FIG. 4 (B) illustrates an example of a receipt of a receipt (a receipt on which a coupon image is printed) printed by the conventional system Q based on the receipt shown in FIG. 4 (A).

As shown in FIG. 4 (A), a receipt control command contains a plurality of commands, starting with a top logo print instructions command C1. This top logo print instructions command C1 is a command that instructs printing the top logo image R1 (FIG. 4 (B)), and includes an image print instructions command GC. The image print instructions command GC includes a command code instructing printing a graphic image, and print data for the image to be printed.

The image data is, for example, data that stores color information such as a gray scale level for each pixel in bitmap data or raster graphic data. In this embodiment, the image print instructions command GC is in the format (XXX "image data") (where XXX is a command code instructing printing an image based on the image data). The image print instructions command GC in the top logo print instructions command C1 is in the format (XXX "image data for top logo image R1").

Next after the top logo print instructions command C1 is a print date instructions command C2. The print date instructions command C2 is a command instructing printing the receipt date image R2 (FIG. 4 (B)), and includes a print string instructions command MC and a line feed command LF.

The print string instructions command MC is a command specifying a specific string and instructing printing the specified string. The print string instructions command MC includes a command code instructing printing a string, and a data packet specifying the string. A combination of characters expressed by specific character codes (such as Unicode or ASCII) is written in the data packet. The print string instructions command MC in the print date instructions command C2 in this example is in the format (YYY "2013/1/1/12:00") (where YYY is the command code instructing printing a string, and the content between double quotation marks is the data packet specifying the string to be printed).

The line feed command LF is a command instructing a line feed.

A line item print instructions command C3 is written next after the print date instructions command C2. A line item print instructions command C3 is a command instructing printing a details image R3 (FIG. 4 (B)), and includes a print string instructions command MC specifying a string expressing the product name, price, quantity, and line item total, and instructing printing the string; and a line feed command LF. Plural line item print instruction commands C3 are included if plural products are purchased.

A transaction total print instructions command C4 is included next after the line item print instructions commands C3. This transaction total print instructions command C4 is a command specifying printing the total amount image R4 (FIG. 4 (B)), and includes a print string instructions command MC specifying the string "Total" and a string denoting the receipt total, and instructing printing the strings; and a line feed command LF.

Following the transaction total print instructions command C4 is a coupon image print instructions command C5. This coupon image print instructions command C5 is a command specifying printing a coupon image R5. The coupon image print instructions command C5 contains an image print instructions command GC, which includes the image data for the coupon image R5 ("coupon image data" below) and instructs printing the coupon image R5 based on the coupon image data. The image print instructions command GC included in the coupon image print instructions command C5 is in the format (XXX "coupon image data").

Next after the coupon image print instructions command C5 is a bottom logo print instructions command C6. The bottom logo print instruction command C6 is a command that instructs printing a bottom logo image R6. The bottom logo print instructions command C6 contains an image print instructions command GC, which includes the image data for the bottom logo image R6 and instructs printing the bottom logo image R6 based on the image data.

Following the bottom logo print instructions command C6 in the receipt control command is a paper cut command SS. This paper cut command SS is a command instructing cutting the roll paper. The paper cut command SS is always the last command in the receipt control command.

Referring again to FIG. 3, the port handler 45 of the data processing unit 41 outputs the input receipt control command to the coupon identification unit 46 (step SB1).

The coupon identification unit 46 of the data processing unit 41 interprets the input receipt control command, and determines if a coupon image print instructions command C5 is contained in the receipt control command (step SB2).

The process performed in step SB2 is described next.

In addition to an image print instructions command GC instructing printing a coupon image R5, the receipt control command also includes image print instructions commands GC instructing printing graphic images such as atop logo image R1 and a bottom logo image R6 as described with reference FIG. 4 (A). The image print instructions commands GC for the images have the same data format, and whether or not one of the image print instructions commands GC is a command instructing printing a coupon image R5 ("coupon image print instructions command") cannot be determined based only on the data format.

As a result, the coupon identification unit 46 determines if a coupon image print instructions command C5 is contained in a receipt control command using one of the following four methods.

Method 1

The 46 extracts an image print instructions command GC contained in the receipt control command. Each image print instructions command GC contains a specific command code (XXX in this example), and the coupon identification unit 46 uses this to extract the image print instructions commands GC.

In the first method, all coupon image data that can be selected by the POS system application AP, in other words, coupon image data for all coupon images that can be printed on receipts, are previously stored in a specific area in the host storage unit 23. Below, this coupon image data stored in the host storage unit 23 is called "template coupon image data." The template coupon image data is bitmap data. This template coupon image data is a type of template data. Template coupon image data for each coupon is stored in the host storage unit 23 relationally to coupon identification information uniquely identifying a particular coupon.

The coupon identification unit 46 extracts the image data contained in the command from the extracted image print instructions command GC, and writes it as bitmap data to specific coordinates defined in work memory. For example, if the image data is raster data, the coupon identification unit 46 appropriately shapes the data and then writes bit image data based on the raster data.

Next, using the template coupon image data as template data, the coupon identification unit 46 applies a pattern matching (comparison) process to compare the buffered image data with all stored template coupon image data. Pattern matching can be done using a method known from the literature.

If a match is found as the result of pattern matching, the coupon identification unit 46 determines the image print instructions command GC is a coupon image print instructions command instructing printing a coupon image. This is because the image data contained in the image print instructions command GC is coupon image data.

Note that when a match is found, the coupon identification unit 46 gets the coupon identification information related to the matching template coupon image data.

However, if a match is not found as the result of pattern matching, the coupon identification unit 46 determines the image print instructions command GC is not a coupon image print instructions command. This is because the image data contained in the image print instructions command GC is not coupon image data.

Note that pattern matching could be applied to a portion of the data. In addition, if the template coupon image data and the image data compared therewith correspond but the data does not match perfectly, a match could be confirmed if the resemblance therebetween exceeds a specific threshold value.

The coupon identification unit 46 extracts all image print instructions commands GC contained in the receipt control command, and uses this method to determine if each extracted image print instructions command GC is a coupon image print instructions command. If at least one coupon image print instructions command is found, the coupon identification unit 46 determines a coupon image print instructions command is included in the receipt control command. If at least one coupon image print instructions command is not found, the coupon identification unit 46 determines a coupon image print instructions command is not included in the receipt control command.

Method 2

The 46 extracts an image print instructions command GC contained in the receipt control command.

In method 2, a string contained in the image of each coupon is identified for all coupons (coupon image data), and these strings are stored in a specific area in the host storage unit 23 relationally to the coupon identification information. These strings stored in the host storage unit 23 are referred to below as "target comparison strings." For example, if the string "10% Discount on Product AA" is contained in the image for coupon A, and this string is not contained in other coupon images, this string "10% Discount on Product AA" is selectively identified as the comparison string, and stored relationally to the coupon identification information.

The coupon identification unit 46 then extracts the image data from the extracted image print instructions command GC, and writes it as bitmap data to specific coordinates defined in work memory.

Next, the coupon identification unit 46 applies character recognition to the buffered image data, and extracts the string contained in the image represented by the image data. Character recognition can be done using a method known from the literature.

Next, the coupon identification unit 46 determines if the extracted string is found in the target comparison strings. This decision can be made using string comparison or other method known from the literature.

If one of the target comparison strings is found in the extracted string, the coupon identification unit 46 determines the extracted image print instructions command GC is a coupon image print instructions command instructing printing a coupon image. This is because the image data contained in the image print instructions command GC is coupon image data. In this event, the coupon identification unit 46 retrieves the coupon identification information related to the target comparison string contained in the extracted string.

If a target comparison string is not found in the extracted string, the coupon identification unit 46 determines the extracted image print instructions command GC is not a coupon image print instructions command. This is because the image data contained in the image print instructions command GC is not coupon image data.

The coupon identification unit 46 extracts all image print instructions commands GC contained in the receipt control command, and uses this method to determine if each extracted image print instructions command GC is a coupon image print instructions command. If at least one coupon image print instructions command is found, the coupon identification unit 46 determines a coupon image print instructions command is included in the receipt control command. If at least one coupon image print instructions command is not found, the coupon identification unit 46 determines a coupon image print instructions command is not included in the receipt control command.

Method 3

The 46 extracts an image print instructions command GC contained in the receipt control command.

In method 3, the data described below is previously stored in a specific area in the host storage unit 23 for all coupon image data that can be selected by the POS system application AP, that is, for the coupon image data for all coupon images that can be printed on a receipt. More specifically, this data is a specific bit train (data train) for a specific line in the coupon image data. There could be plural specific lines, and the bit train could be a portion of the bits instead of all bits in a specific line.

The bit string for each coupon is stored to a specific area in the host storage unit 23 relationally to the coupon identification information. These bit strings stored in the host storage unit 23 are referred to below as "comparison target bit strings."

The coupon identification unit 46 then extracts the image data from the extracted image print instructions command GC, and writes it as bitmap data to specific coordinates defined in work memory.

Next, the coupon identification unit 46 extracts a specific bit string from a specific line in the buffered image data.

Next, the coupon identification unit 46 compares the extracted bit string with the stored comparison target bit strings.

If one of the target comparison bit strings matches the extracted bit string, the coupon identification unit 46 determines the extracted image print instructions command GC is a coupon image print instructions command instructing printing a coupon image. This is because the image data contained in the image print instructions command GC is coupon image data. In this event, the coupon identification unit 46 retrieves the coupon identification information related to the matching target comparison bit string.

If none of the target comparison bit strings matches the extracted bit string, the coupon identification unit 46 determines the extracted image print instructions command GC is not a coupon image print instructions command. This is because the image data contained in the image print instructions command GC is not coupon image data.

The coupon identification unit 46 extracts all image print instructions commands GC contained in the receipt control command, and uses this method to determine if each extracted image print instructions command GC is a coupon image print instructions command. If at least one coupon image print instructions command is found, the coupon identification unit 46 determines a coupon image print instructions command is included in the receipt control command. If at least one coupon image print instructions command is not found, the coupon identification unit 46 determines a coupon image print instructions command is not included in the receipt control command.

Method 4

The 46 extracts an image print instructions command GC contained in the receipt control command.

In method 4, an error detection code or a hash using a predetermined hash function is previously stored in a specific area in the host storage unit 23 for all coupon image data that can be selected by the POS system application AP, that is, for the coupon image data for all coupon images that can be printed on a receipt. The error detection code or hash values are collectively referred to below as a "data origin value."

Each data origin value is stored in a specific area in the host storage unit 23 relationally to coupon identification information. The data origin values stored in the host storage unit 23 are referred to below as "comparison target origin values."

The coupon identification unit 46 then extracts the image data from the extracted image print instructions command GC, and writes it as bitmap data to specific coordinates defined in work memory.

Next, the coupon identification unit 46 calculates the data origin value of the buffered image data. When the data origin value is an error correction code, the coupon identification unit 46 calculates the error correction code based on a specific formula, and when the data origin value is a hash value, calculates the hash value using a specific hash function.

Next, the coupon identification unit 46 compares the calculated data origin value with the stored comparison target origin values.

If one of the comparison target origin values matches the calculated data origin value, the coupon identification unit 46 determines the extracted image print instructions command GC is a coupon image print instructions command instructing printing a coupon image. This is because the image data contained in the image print instructions command GC is coupon image data. In this event, the coupon identification unit 46 retrieves the coupon identification information related to the matching comparison target origin value.

If none of the comparison target origin value matches the calculated data origin value, the coupon identification unit 46 determines the extracted image print instructions command GC is not a coupon image print instructions command. This is because the image data contained in the image print instructions command GC is not coupon image data.

The coupon identification unit 46 extracts all image print instructions commands GC contained in the receipt control command, and uses this method to determine if each extracted image print instructions command GC is a coupon image print instructions command. If at least one coupon image print instructions command is found, the coupon identification unit 46 determines a coupon image print instructions command is included in the receipt control command. If at least one coupon image print instructions command is not found, the coupon identification unit 46 determines a coupon image print instructions command is not included in the receipt control command.

If a coupon image print instructions command C5 is found in the receipt control command using any of the four methods described above, the coupon identification unit 46 gets the coupon identification information for the coupon image R5 instructed to be printed by the coupon image print instructions command C5.

Referring again to FIG. 3, in step SB2 the coupon identification unit 46 determines using any of these four methods if a coupon image print instructions command C5 is contained in the receipt control command.

If a coupon image print instructions command C5 is not detected (step SB2 returns NO), a receipt is issued using the normal method (step SB3). Details of the operation performed in step SB3 are omitted.

However, if a coupon image print instructions command C5 is detected (step SB5 returns YES), the coupon identification unit 46 outputs the receipt control command to the command processor 47 (step SB4).

The command processor 47 then extracts the coupon image print instructions command C5 from the input receipt control command, applies data processing required to maintain data integrity, and generates a processed receipt control command (step SB5). More specifically, the processed receipt control command does not contain a coupon image print instructions command C5, and the coupon image R5 is therefore not printed when images based on the processed receipt control command are printed.

Next, the command processor 47 outputs information setting the first communication port TP1 as the output port with the processed receipt control command to the port handler 45 (step SB6).

The port handler 45 applies data processing appropriate to the specified first communication port TP1, and outputs the processed receipt control command to the first communication port TP1 (step SB7). As a result, the processed receipt control command is sent to the receipt printer 10. The receipt printer control unit 30 of the receipt printer 10 then executes processes based on the processed receipt control command and outputs a receipt.

Figure 5B:
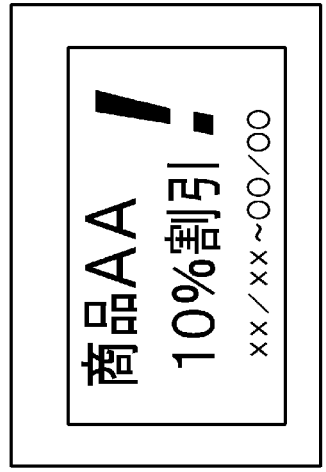
FIG. 5 (A) shows an example of an issued receipt, and (B) shows an example of a printed coupon.
Figure 5A:
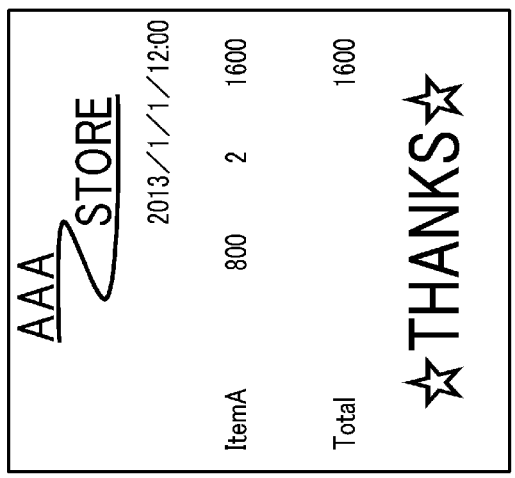

FIG. 5 (A) shows an example of a printed receipt. As will be obvious by comparing FIG. 5 (A) and FIG. 4 (B), the coupon image R5 is not printed on the receipt produced based on the processed receipt control command.

The command processor 47 also generates a coupon control command based on the coupon image print instructions command C5 detected by the coupon identification unit 46 (step SB8).

More specifically, a coupon image database DB1 is stored in the host storage unit 23 of the host computer 12 as described above. Image data compatible with the coupon printer 11 ("coupon image data for printing" below) and coupon identification information are relationally stored for each coupon that can be printed in the coupon image database DB1. Image data compatible with the coupon printer 11 means image data that is compatible with the resolution and printing method of the printer and enables the coupon printer 11 to print an image based on the image data.

The command processor 47 gets the coupon identification information acquired by the coupon identification unit 46. This coupon identification information is coupon identification information for the coupon image R5 intended for printing on the receipt. Next, the command processor 47 references the coupon image database DB1, and gets the coupon image data for printing related to the acquired coupon identification information.

Next, the command processor 47 generates a coupon control command, which is a control command conforming to the command language of the coupon printer 11 and specifies printing an image based on the acquired coupon image data for printing.

After generating the coupon image data for printing, the command processor 47 outputs the coupon image data for printing and information setting the second communication port TP2 as the output port to the port handler 45 (step SB9).

The port handler 45 then applies data processing appropriate to the specified second communication port TP2, and outputs the coupon control command to the second communication port TP2 (step SB10). As a result, the coupon control command is sent to the coupon printer 11. The coupon printer control unit 32 of the coupon printer 11 then executes processes based on the coupon control command and outputs a coupon.

FIG. 5 (B) shows an example of the printed coupon. As will be obvious by comparing FIG. 5 (B) and FIG. 4 (B), the coupon image R5 that is printed on the receipt by the conventional system Q is printed on the coupon.

As described above, a host computer 12 according to this embodiment has a print control unit 40 that generates a receipt control command that causes the receipt printer 10 (first printing device) to print a receipt. The host computer 12 also has a data processing unit 41 that determines if a coupon image print instructions command is contained in the receipt control command generated by the print control unit 40, and if the receipt control command also contains a coupon image print instructions command, removes the coupon image print instructions command to generate and output a processed receipt control command to the receipt printer 10, and generates coupon image data for printing a coupon image based on the coupon image print instructions command and outputs to the coupon printer 11.

A receipt on which a coupon image is not printed is therefore issued by the receipt printer 10, and a coupon is issued by the coupon printer 11. Because the receipt control command output by the print control unit 40 to print receipts and coupons separately is the same as the command output in the conventional system Q, there is no need to modify the program rendering the functions of the print control unit 40. More specifically, changes to the host computer 12 can be minimized.

In this embodiment, the data processing unit 41 extracts an image print instructions command from the receipt control command, compares image data contained in the extracted image print instructions command with previously stored template data, and if the image data matches the template data, determines that the extracted image print instructions command is a coupon image print instructions command and determines that a coupon image print instructions command is contained in the receipt control command.

The image of the coupon intended to be printed on the receipt is not generated ad hoc, but instead is selected from a group of previously stored images. Based on the result of using this feature to compare image data contained in the image print instructions command extracted from the receipt control command with previously stored template data, this embodiment can accurately determine if the extracted image print instructions command is a coupon image print instructions command.

Alternatively, the data processing unit 41 extracts an image print instructions command from the receipt control command, recognizes characters in the image data contained in the extracted image print instructions command, and if a predetermined specific string is found, determines that the extracted image print instructions command is a coupon image print instructions command and determines that a coupon image print instructions command is contained in the receipt control command.

In this configuration, a specific string is contained in the image of the coupon intended to be printed on the receipt. Using this feature, this embodiment can accurately determine if the extracted image print instructions command is a coupon image print instructions command based on the result of character recognition.

Alternatively, the data processing unit 41 extracts an image print instructions command from the receipt control command, and if at least part the image data contained in the extracted image print instructions command contains a predetermined specific data string, determines that the extracted image print instructions command is a coupon image print instructions command and determines that a coupon image print instructions command is contained in the receipt control command.

In this configuration, the image of the coupon intended to be printed on the receipt is not generated ad hoc, but instead is selected from a group of previously stored images, and part of a particular image includes a specific data train. Using this feature, this embodiment can accurately determine if the extracted image print instructions command is a coupon image print instructions command.

Alternatively, the data processing unit 41 extracts an image print instructions command from the receipt control command, and if the error detection code or hash value of the image data contained in the extracted image print instructions command matches a predetermined specific value, determines that the extracted image print instructions command is a coupon image print instructions command and determines that a coupon image print instructions command is contained in the receipt control command.

In this configuration, the image of the coupon intended to be printed on the receipt is not generated ad hoc, but instead is selected from a group of previously stored images, and the error detection code or hash value of any one image is a specific value. Using this feature and the error detection code or hash value, this embodiment can accurately determine if the extracted image print instructions command is a coupon image print instructions command.

Embodiment 2

A second embodiment of the invention is described next.

Figure 6:
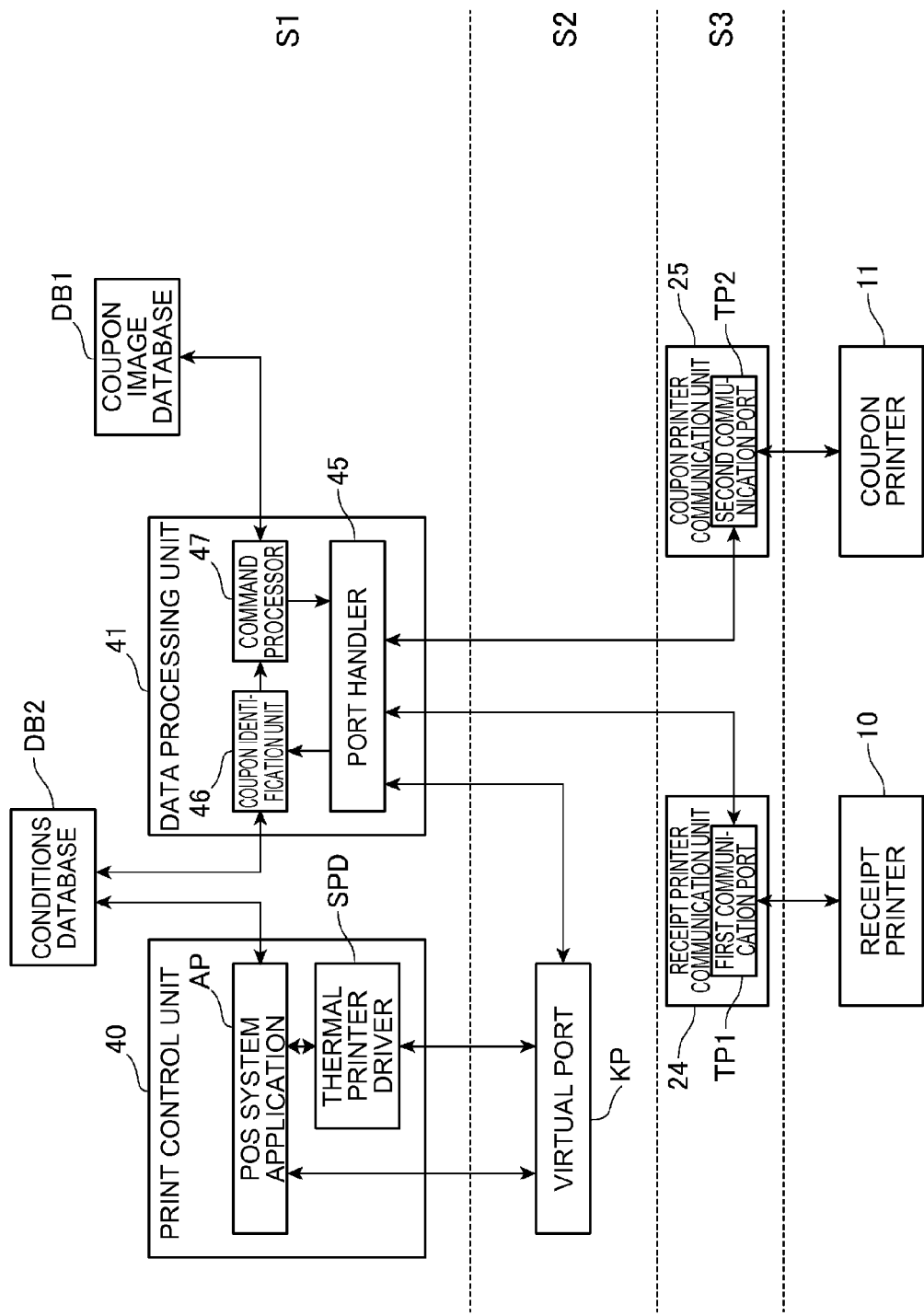
FIG. 6 is a block diagram showing the configuration of a host computer according to a second embodiment of the invention.

FIG. 6 is a block diagram showing the functional configuration of the host computer 12 in a second embodiment of the invention. Note that like parts in this and the first embodiment are identified by like reference numerals, and further description thereof is omitted.

As will be obvious by comparing FIG. 2 and FIG. 6, this embodiment differs from the first embodiment in that a conditions database DB2 is stored in the host storage unit 23 (not shown in FIG. 6).

In the conventional system Q, a condition for printing a coupon image on a receipt, and coupon identification information for the coupon to be printed when the condition is satisfied, are relationally stored in the conditions database DB2. There could be plural conditions.

Examples of such conditions include that a product of a specific product name is purchased, or that a specific quantity or more of product of a specific product name is purchased, in the transaction related to printing a receipt could be conditions. That the total purchase amount exceeds a predetermined specific amount could be another condition.

A configuration in which the condition changes dynamically based on the time or member is also conceivable. In other words, a condition could be any that is determined to be met or not based on information printed on the receipt.

The process of producing a separate receipt and coupon is described next.

When printing a receipt, the print control unit 40 first accesses the conditions database DB2 and determines if a specific condition is met using a function of the POS system application AP.

If a condition was satisfied, the print control unit 40 generates and outputs to the port handler 45 a receipt control command (a command such as shown in FIG. 4 (A)) instructing printing an image of the coupon identified by the coupon identification information related to the condition on the receipt.

As described above, a coupon image print instructions command is contained in the receipt control command generated by the print control unit 40.

The port handler 45 outputs the input receipt control command to the coupon identification unit 46. The coupon identification unit 46 interprets the input receipt control command, accesses the conditions database DB2, and appropriately determines if any of the stored conditions are satisfied. More specifically, the coupon identification unit 46 interprets the receipt control command and acquires the information needed to determine if a condition is met, such as the names and quantities of the purchased products and the transaction total. The coupon identification unit 46 then accesses the conditions database DB2, and determines if any condition stored in the database is satisfied.

If a condition is met, the coupon identification unit 46 determines that a coupon image print instructions command is contained in the receipt control command. Next, the coupon identification unit 46 identifies the coupon image print instructions command in the receipt control command. This can be done using any desired method. For example, when the position of the coupon image R5 is predetermined in relation to other images, the coupon identification unit 46 identifies the coupon image print instructions command based on the position of the coupon image R5 relative to other images.

Using the same method described in the first embodiment, the command processor 47 then generates and outputs the processed receipt control command to the receipt printer 10, and generates and outputs a coupon control command to the coupon printer 11.

Individual receipts and coupons can therefore be printed without changing the program rendering the functions of the print control unit 40.

As described above, when a specific condition related to the transaction for which a receipt is to be printed is met, the print control unit 40 in this embodiment inserts a coupon image print instructions command related to a coupon corresponding to the satisfied condition in the receipt control command. Based on the receipt control command, the data processing unit 41 determines if a specific condition related to the transaction for which the receipt is to be printed is satisfied, and if the condition is met, determines that a coupon image print instructions command is contained in the receipt control command.

Because a coupon image print instructions command corresponding to the condition is included in the receipt control command when a particular condition is met, this embodiment can accurately determine if a coupon image print instructions command is contained in the receipt control command.

The invention is described above with reference to a preferred embodiment thereof, but the invention is not limited thereto and can be modified and adapted in many ways without departing from the scope of the accompanying claims.

For example, the first printing device is a thermal printer and the second printing device is an inkjet printer in the foregoing embodiments, but the invention can be applied using any type of printing method.

The function blocks shown in FIG. 1, FIG. 2 and FIG. 6 are also achieved by the cooperation of hardware and software, and do not suggest a specific hardware configuration. For example, functions of the host computer 12 can also be handled by other devices externally connected thereto. The host computer 12 can also be made to operate as described above by executing a program stored on an externally connected storage medium. Possible storage media include hard disk drives, optical discs, magneto-optical discs, and flash memory devices.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A control device connected to a first printing device that prints receipts and a second printing device that is different from the first printing device, the control device comprising a Central Processing Unit (CPU) that functions as:
    a data processing unit external to the first printing device and the second printing device; and
    a print control unit that generates and outputs a receipt control command for causing the first printing device to produce a receipt, wherein the receipt control command is output to the data processing unit instead of the first printing device, and
    wherein the data processing unit is configured to:
        extract image print instruction commands included in the receipt control command for causing the first printing device to produce the receipt, the image print instruction commands specifying printing of an image and containing image data;
        determine whether the image print instruction commands in the receipt control command includes a coupon image print instructions command for causing the first printing device to print a coupon image on the receipt, the coupon image print instructions command containing image data for the coupon image; and
        in an event the coupon image print instructions command is included in the receipt control command:
            generate and output to the first printing device a modified receipt control command without the coupon image print instructions command to print the receipt without the coupon image; and
            generate and output to the second printing device a coupon control command to print the coupon image based on the coupon image print instructions command of the receipt control command.

2. The control device of claim 1, wherein:
the data processing unit compares the image data contained in each extracted image print instructions command with previously stored template data, and if the data match, determines that the extracted image print instructions command is the coupon image print instructions command and determines that the coupon image print instructions command is included in the receipt control command.

3. The control device of claim 1, wherein:
the data processing unit recognizes a character in the image data contained in each extracted image print instructions command, and if a predetermined specific string is found, determines that the extracted image print instructions command is the coupon image print instructions command and determines that the coupon image print instructions command is included in the receipt control command.

4. The control device of claim 1, wherein:
the data processing unit, if at least part of the image data contained in each extracted image print instructions command includes a predetermined specific data train, determines that the extracted image print instructions command is the coupon image print instructions command and determines that the coupon image print instructions command is included in the receipt control command.

5. The control device of claim 1, wherein:
the data processing unit, if an image data error correction code or hash value contained in each extracted image print instructions command matches a predetermined specific value, determines that the extracted image print instructions command is the coupon image print instructions command and determines that the coupon image print instructions command is included in the receipt control command.

6. The control device of claim 1, wherein:
when a specific condition related to a transaction for which the receipt is to be produced is met, the print control unit includes the coupon image print instructions command related to a coupon corresponding to the satisfied condition in the receipt control command; and
the data processing unit determines, based on the receipt control command, if the specific condition related to the transaction for which the receipt is to be produced is met, and if the condition is met, determines the coupon image print instructions command is included in the receipt control command.

7. A method for controlling a control device that connects to a first printing device that prints receipts and a second printing device that is different from the first printing device, the method comprising:
generating and outputting, by a print control unit, a receipt control command for causing the first printing device to produce a receipt, wherein the receipt control command is output to a data processing unit instead of the first printing device, wherein the data processing unit that is external to the first printing device and the second printing device;
extracting, by the data processing unit, image print instruction commands included in the receipt control command for causing the first print device to produce the receipt, the image print instruction commands specifying printing of an image and containing image data;
determining, by the data processing unit, whether the image print instruction commands in the receipt control command includes a coupon image print instructions command for causing the first printing device to print a coupon image on the receipt, the coupon image print instructions command and containing image data for the coupon image; and
in an event the coupon image print instructions command is included in the receipt control command, generating and outputting to the first printing device a modified receipt control command without the coupon image print instructions command to print the receipt without the coupon image, and generating and outputting to the second printing device a coupon control command to print the coupon image based on the coupon image print instructions command of the receipt control command.

8. The method of claim 7, further comprising:
comparing the image data contained in each extracted image print instructions command with previously stored template data; and
if the data match, determining that the extracted image print instructions command is the coupon image print instructions command and determining that the coupon image print instructions command is included in the receipt control command.

9. The method of claim 7, further comprising:
recognizing a character in the image data contained in each extracted image print instructions command; and
if a predetermined specific string is found, determining that the extracted image print instructions command is the coupon image print instructions command and determining that the coupon image print instructions command is included in the receipt control command.

10. The method of claim 7, further comprising:
if at least part of the image data contained in each extracted image print instructions command includes a predetermined specific data train, determining that the extracted image print instructions command is the coupon image print instructions command and determining that the coupon image print instructions command is included in the receipt control command.

11. The method of claim 7, further comprising:
if an image data error correction code or hash value contained in each extracted image print instructions command matches a predetermined specific value, determining that the extracted image print instructions command is the coupon image print instructions command and determining that the coupon image print instructions command is included in the receipt control command.

12. The method of claim 7, further comprising:
determining if a specific condition related to a transaction for which the receipt is to be produced is met, and including the coupon image print instructions command related to a coupon corresponding to the satisfied condition in the receipt control command if the specific condition is met; and
determining based on the receipt control command if the specific condition related to the transaction for which the receipt is to be produced is met, and determining the coupon image print instructions command is included in the receipt control command if the condition is met.

13. A non-transitory storage medium storing a program executed by a control unit controlling a control device that connects to a first printing device that prints receipts and a second printing device that is different from the first printing device, the program causing the control unit to:
generate and output a receipt control command for causing the first printing device to produce a receipt, wherein the receipt control command is not output to the first printing device;
extract image print instruction commands included in the receipt control command for causing the first print device to produce the receipt, each of the image print instruction commands specifying printing of an image and containing image data;
determine whether the extracted image print instruction commands in the receipt control command include a coupon image print instructions command for causing the first printing device to print a coupon image on the receipt, the coupon image print instructions command containing image data for the coupon image; and
in an event the coupon image print instructions command is included in the receipt control command, generate and output to the first printing device a modified receipt control command without the coupon image print instructions command to print the receipt without the coupon image, and generate and output to the second printing device a coupon control command to print the coupon image based on the coupon image print instructions command of the receipt control command.

* * * * *